(12) United States Patent
Gruenberger et al.

(10) Patent No.: US 11,268,626 B2
(45) Date of Patent: Mar. 8, 2022

(54) PROPORTIONAL VALVE FOR CONTROLLING A GASEOUS MEDIUM AND FUEL CELL ARRANGEMENT

(71) Applicant: Robert Bosch GmbH, Stuttgart (DE)

(72) Inventors: Andreas Gruenberger, Spraitbach (DE); Hans-Christoph Magel, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/625,742

(22) PCT Filed: Apr. 25, 2018

(86) PCT No.: PCT/EP2018/060581
§ 371 (c)(1),
(2) Date: Dec. 22, 2019

(87) PCT Pub. No.: WO2018/233912
PCT Pub. Date: Dec. 27, 2018

(65) Prior Publication Data
US 2021/0148484 A1 May 20, 2021

(30) Foreign Application Priority Data

Jun. 21, 2017 (DE) ...................... 10 2017 210 351.5

(51) Int. Cl.
*F16K 31/06* (2006.01)
*F16K 1/36* (2006.01)
(Continued)

(52) U.S. Cl.
CPC ............ *F16K 31/0655* (2013.01); *F16K 1/36* (2013.01); *F16K 1/42* (2013.01); *H01M 8/04089* (2013.01)

(58) Field of Classification Search
CPC .......... F16K 1/36; F16K 1/42; F16K 31/0655; H01M 8/04089
See application file for complete search history.

(56) References Cited

U.S. PATENT DOCUMENTS 6,155,534 A 12/2000 Steinruck et al.
7,040,596 B2 * 5/2006 Sonoda .................... F16K 1/36
251/129.15

(Continued)

FOREIGN PATENT DOCUMENTS

CH 551585 A 7/1974
CN 101120475 A 2/2008
(Continued)

OTHER PUBLICATIONS

International Search Report for Application No. PCT/EP2018/060581 dated Aug. 27, 2018 (English Translation, 2 pages).

*Primary Examiner* — Eric Keasel
(74) *Attorney, Agent, or Firm* — Michael Best & Friedrich LLP

(57) ABSTRACT

The invention relates to a proportional valve (100) for controlling a gaseous medium, in particular hydrogen, comprising a movable closure element (301) and a first spring (302) arranged on the closure element (301), the first spring (302) being configured in order to exert a first spring force on the closure element (301) in a closing direction, and an actuator (200), the actuator (200) being configured in order to provide an adjustable force in the opposite direction to the first spring force, the closure element (301) being configured in order to close and to open a through opening (102) by the movement, the proportional valve (100) comprising a closure element (305) which is arranged at an end of the closure element (301) remote from the first spring (302), and a second spring (304), the second spring (304) being arranged on the closure element (305) and the second spring (304)

(Continued)

being configured in order to exert a second spring force on the closure element (305), the second spring force counteracting the first spring force.

10 Claims, 5 Drawing Sheets

(51) Int. Cl.
*F16K 1/42* (2006.01)
*H01M 8/04089* (2016.01)

(56) References Cited

U.S. PATENT DOCUMENTS

| | | | |
|---|---|---|---|
| 2004/0232373 | A1 | 11/2004 | Sonoda et al. |
| 2005/0189509 | A1 | 9/2005 | Peric |
| 2009/0325031 | A1* | 12/2009 | Sugawara ......... H01M 8/04231 429/425 |
| 2012/0115056 | A1 | 5/2012 | Meier |

FOREIGN PATENT DOCUMENTS

| | | |
|---|---|---|
| CN | 102472210 A | 5/2012 |
| DE | 19905722 | 8/1999 |
| DE | 10010734 | 9/2001 |
| DE | 102010043618 | 5/2012 |
| DE | 102012204565 | 9/2013 |
| DE | 102014210066 | 12/2015 |
| DE | 102014213235 | 1/2016 |
| JP | 2005282837 A | 10/2005 |
| WO | 2005083309 A1 | 9/2005 |

* cited by examiner

PROPORTIONAL VALVE FOR CONTROLLING A GASEOUS MEDIUM AND FUEL CELL ARRANGEMENT

BACKGROUND OF THE INVENTION

The invention relates to a proportional valve for controlling a gaseous medium, and to a fuel cell arrangement.

DE 102010043618 A1 describes a proportional valve for controlling a gaseous medium, such as hydrogen. The closing element which is configured as a needle is connected to a closing spring. Via an actuator which comprises a magnet coil and an armature, the needle is of movable configuration for opening and closing a passage opening.

SUMMARY OF THE INVENTION

The invention proceeds from a proportional valve for controlling a gaseous medium, and from a fuel cell arrangement.

It is one advantage of a proportional valve according to the invention that an inexpensive realization is made possible, since tolerance requirements during the production can be reduced, without losses in the tightness of the proportional valve. In this way, a satisfactory seat tightness and therefore a high reliability and safety during the gas metering, and inexpensive valve manufacturing are made possible.

This is achieved by way of a proportional valve according to the invention for controlling a gaseous medium, in particular hydrogen, which proportional valve comprises a moving closing element and a first spring which is arranged on the closing element. The first spring is set up to exert a first spring force on the closing element in the closing direction. Furthermore, the proportional valve comprises an actuator, the actuator being set up to provide an adjustable force which is directed counter to the first spring force. The closing element is set out to close and to open a passage opening by way of the movement. The proportional valve according to the invention is distinguished by the fact that it comprises a closure element which is arranged at one end of the closing element. Furthermore, the proportional valve is distinguished by the fact that it comprises a second spring, the second spring being arranged on the closure element, and the second spring being set up to exert a second spring force on the closure element, the second spring force acting counter to the first spring force.

One advantage is that reliable closure of the passage opening is dependent on the design of the first spring force and the second spring force, it being possible for the manufacture of the springs and therefore the design of the spring forces to be carried out with a high accuracy. The reliable closure is therefore dependent on a differential force of the springs and not on an absolute force. It is a further advantage that the second spring acts in the opening direction and therefore prevents the closing element and the closure element from separating from one another, which is of interest, in particular, when the closing element and the closure element are not connected fixedly to one another, but rather are configured separately from one another. It is one advantage of the separate configuration of the closing element and the closure element that the closure element can be oriented parallel to the valve seat, since a movement between the closure element and the closing element is possible. In this way, the closure element can be oriented in parallel even in the case of existing tolerances between the closing element and the valve seat, and a satisfactory tightness is achieved. A further advantage which results from the arrangement of the second spring is that wear of the proportional valve is reduced and therefore the service life of the proportional valve can be increased.

In a further embodiment, the closing element can be configured to close or to release a valve seat which is configured in the region of the passage opening. One advantage is that a tightness of the valve seat can therefore be ensured in the case of an increasing supply pressure.

In a further embodiment, the closing element and the closure element are arranged on one another by way of the first spring force and the second spring force. One advantage is that a connection of the closing element and the closure element is simplified, since the closing element and the closure element can be configured as separate components and are not connected fixedly to one another, but rather are fixed on one another by way of the first spring force and the second spring force. Furthermore, the tolerance requirements of the construction of the proportional valve can be reduced as a result, without the accuracy for achieving a sufficient tightness decreasing. A further advantage is that an improved adjustability of the resulting spring force is made possible in this way.

In a further embodiment, the first spring force is greater in terms of magnitude than the second spring force. One advantage is that the passage opening is closed in the basic state, that is to say when the actuator is not energized, and therefore no gas can pass through the passage opening.

In a further embodiment, the second spring force can be selected to be greater than the maximum occurring closing force on the valve seat, which maximum occurring closing force results from the supply pressure and the throughflow. This can advantageously ensure that the valve seat opens reliably in every operating condition.

In a further embodiment, the closure element can comprise a supporting structure, the second spring being operatively connected to the closure element via the supporting structure. One advantage is that arranging of the second spring on the closure element can be realized in this way and, furthermore, it can be made possible that the second spring force acts counter to the first spring force.

In a further embodiment, the closure element can be of pot-shaped configuration. In this way, the second spring can advantageously exert a second spring force which acts counter to the first spring force on the closure element. One advantage is that the second spring can therefore be arranged in a space-saving manner, and the compactness of the proportional valve can therefore be increased.

In a further embodiment, an elastic element can be arranged on a face of the closure element, which face faces the passage opening. This can advantageously achieve a situation where, in the closed state, the closure element already seals the passage opening in the case of a low pressing force, with the result that no gas can pass through the passage opening. In this way, precise gas metering can be made possible.

In a further embodiment, an inflow space and the closing element can be arranged on a first side of the passage opening, and an outflow space can be configured on a second side of the passage opening, which second side faces away from the first side, it being possible for the inflow space and the outflow space to be connected to one another via the passage opening. One advantage is that the gas in the inflow space therefore contributes to the closing force and therefore acts in an assisting manner in the case of the sealing of the passage opening by way of the closure element, in particular in the basic state. In this way, the tightness and reliability of the proportional valve can be increased.

In a further embodiment, a contact point of the closing element with the closure element can be of crowned configuration. One advantage is that a compensation of angular tolerances can be improved as a result. In this way, the tightness and the reliability of the proportional valve can be increased.

In a further embodiment, the actuator can comprise a magnet coil and a magnet armature, the magnet armature being connected fixedly to the closing element, and it being possible for the magnet armature to be moved in a reciprocating movement by way of the magnet coil. One advantage is that an opening stroke is set in an infinitely variable manner in this way, since the first and second spring force are proportional to the deflection of the respective spring in accordance with Hooke's Law and the gas metering can thus be set.

A fuel cell arrangement having the proportional valve for controlling a hydrogen feed to a fuel cell can advantageously make reliable setting of the gas metering possible and can therefore adapt the gas metering reliably to the requirement of the fuel cell. Further advantages are the low pressure fluctuations in the anode path of the fuel cell and the quiet operation of the proportional valve.

BRIEF DESCRIPTION OF THE DRAWINGS

Exemplary embodiments of the invention are shown in the drawings and will be described in greater detail in the following description. Identical designations in the figures denote identical or identically acting elements.

In the figures.

DETAILED DESCRIPTION

Figure 1:
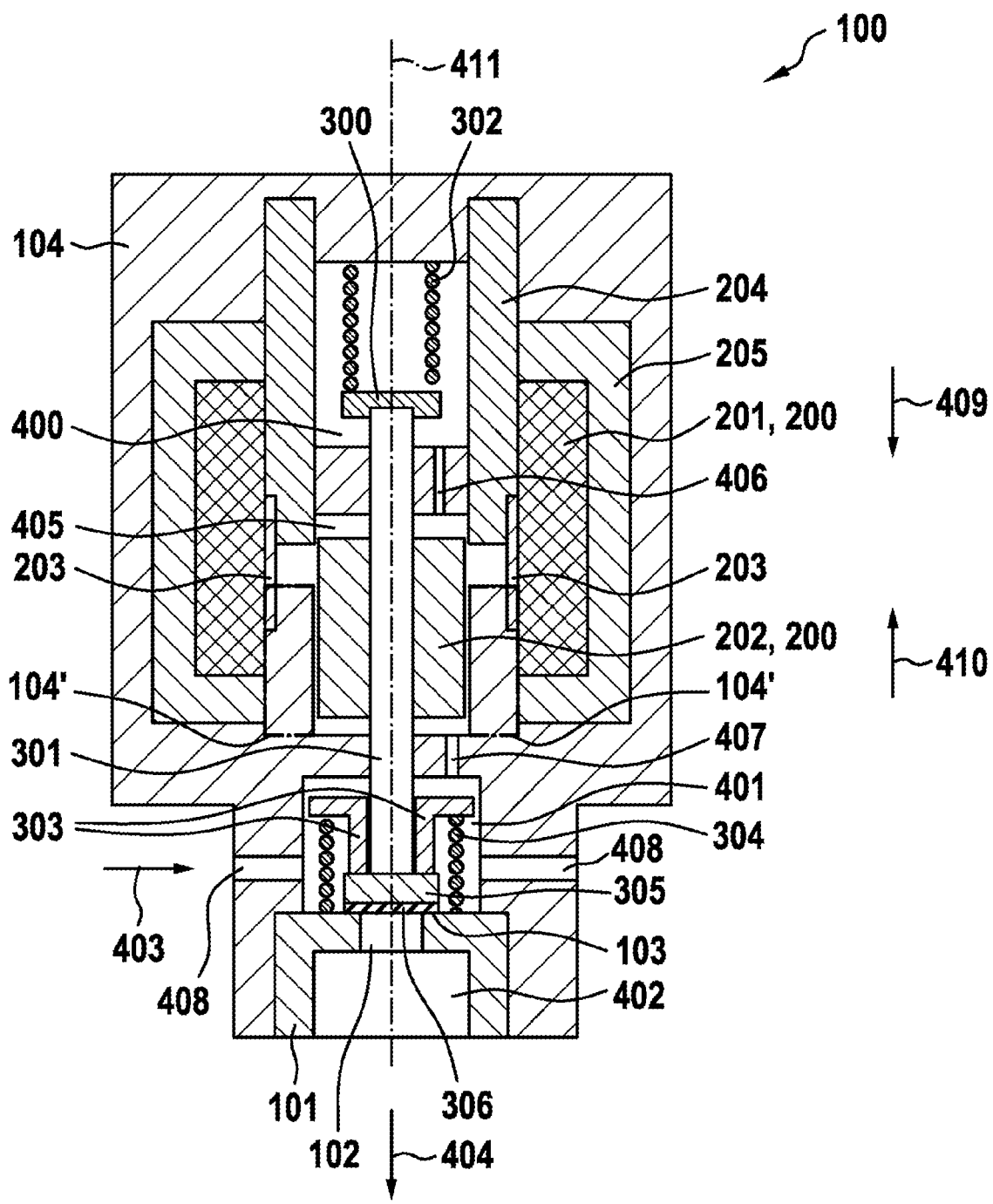
FIG. 1 shows a cross section of a proportional valve in accordance with a first exemplary embodiment, comprising a first spring and a second spring.

FIG. 1 shows a cross section of a proportional valve 100 for controlling a gaseous medium, in particular hydrogen, in accordance with a first exemplary embodiment. The proportional valve 100 comprises a movable closing element 301 and a first spring 302 which is arranged on the closing element 301, the first spring 302 exerting a first spring force on the closing element 301 in a closing direction 409. Here, the first spring 302 is configured as a compression coil spring. The first spring 302 is arranged at a first end of the closing element 301, the first spring 302 being supported with the other end on a valve housing 104. Here, the valve housing 104 surrounds the entire proportional valve 100. A closure element 305 is arranged at an end of the closing element 301, which end faces away from the first end. Furthermore, the proportional valve 100 comprises an actuator 200. The actuator 200 and the closing element 301 are arranged in the valve housing 104. The actuator 200 is set up to provide an adjustable force which is directed counter to the first spring force on the closing element 301. The closing element 301 is configured to close and to open a passage opening 102 by way of the movement.

In the exemplary embodiment which is shown in FIG. 1, the actuator 200 comprises a magnet armature 202 which is connected fixedly to the closing element 301, and a magnet coil 201. The magnet armature 202 can be moved with a reciprocating movement by way of the magnet coil 201. The magnet armature 202 is arranged at least partially in the interior of the magnet coil 201. Here, the magnet armature 202 is of cylindrical configuration. Here, the closing element 301 is of rod-shaped configuration, the rod-shaped closing element 301 running through the magnet armature 202 along an axis of symmetry 411 of the magnet armature 202, and it being possible for said rod-shaped closing element 301 to be moved with a reciprocating movement parallel to the axis of symmetry 411.

Furthermore, an inner pole 204 is received partially in the interior of the magnet coil 201, and an outer pole 205 is arranged between the valve housing 104 and the magnet coil 201 and forms a solenoid plunger as a result. Spacer sleeve elements 203 are arranged in the interior of the magnet coil 201, by means of which spacer sleeve elements 203 the inner pole 204 is connected to a valve housing section 104' which extends into the interior of the magnet coil 201. In FIG. 1, the valve housing section 104' is of hollow-cylindrical configuration. The inner pole 204 and the valve housing section 104' which extends into the interior of the magnet coil 201 serve as a guide for the magnet armature 202. The spacer sleeve elements 203 are preferably configured from a non-magnetic material, for example a non-magnetic metal. Together with the spacer sleeve elements 203, the valve housing 104 and the inner pole 204 delimit an armature space 405, in which the magnet armature 202 is arranged. Together with the valve housing 104, the inner pole 204 encloses a spring space 401 on a side which faces away from the armature space 405, in which spring space 401 the first spring 302 is arranged. The spring space 400 is connected to the armature space 405 via a first channel 406, and the armature space 405 is connected to an inflow space 401 via a second channel 407. The first channel 406 and the second channel 407 make pressure equalization between the spring space 400, the armature space 405 and the inflow space 401 possible.

Figure 4:
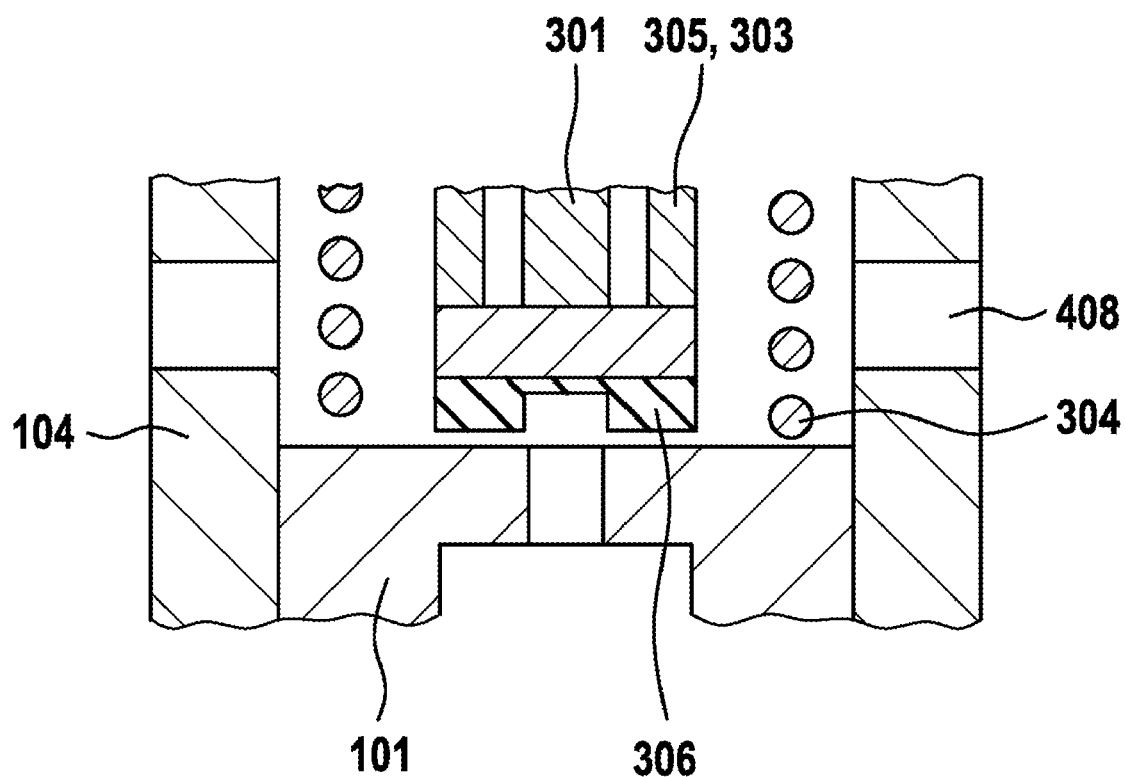
FIG. 4 shows a detail of a cross section of a proportional valve in accordance with a third exemplary embodiment.

The proportional valve 100 in FIG. 1 comprises a second spring 304 which is arranged on the closure element 305. In the exemplary embodiment which is shown in FIG. 1, the closure element 305 comprises a supporting structure 303, the second spring 304 being operatively connected to the closure element 305 via the supporting structure 303. In FIG. 1, the closure element 305 is of pot-shaped configuration, the supporting structure 303 forming an annular projecting length of the closure element 305, on which projecting length the second spring 304 is supported. The axis of symmetry 411 of the closing element 301 and of the closure element 305 are identical. In FIG. 1, the closure element 305 and the second spring 304 are arranged in the inflow space 401 of the proportional valve 100, the inflow space 401 being delimited by the valve housing 104 and a nozzle body 101 in the exemplary embodiment which is shown in FIG. 1. The inflow space 401 can be connected to an outflow space 402 via the passage opening 102. Via an inflow channel 408 which is configured as an opening between the surrounding area of the proportional valve 100 and the inflow space 401, a gas, for example hydrogen, can be introduced from the surrounding area into the inflow space 401 in an inflow direction 403. If the closure element 305 releases the passage opening 102, the gas can flow from the inflow space 401 into the outflow space 402 in the outflow direction 404. In FIG. 1, the outflow space 402 is delimited by way of the nozzle body 101 which is received partially by the valve housing 104. As an alternative or in addition, the outflow space 402 can be delimited at least partially by the valve housing 104. A valve seat 103 is configured on a side of the passage opening 102, which side faces the inflow space 401. In FIG. 1, the valve seat 103 is configured as a flat seat on the nozzle body 101, an elastic element 306 being arranged between the closure element 305 and the nozzle body 101 in FIG. 1. In a further exemplary embodiment which is shown in a detailed illustration in FIG. 4, an elevated sealing edge is provided on the elastic element 306 in order to increase the tightness.

The first spring 302 is set up to exert a first spring force on the closing element 301 in the closing direction 409. The first spring 302 is supported firstly with a first end on the valve housing 104, and transmits the first spring force to the closing element 301. Secondly, the first spring 302 is supported with its second end on the closing element 301. In FIG. 1, a spring collar 300 is additionally arranged between the closing element 301 and the first spring 302. The spring collar 300 can transmit the first spring force from the first spring 302 to the closing element 301. The first spring 302 loads the closing element 301 and therefore the closure element 305 with the first spring force which acts in the closing direction 409, that is to say in the direction of the valve seat 103. The closure element 305 is loaded by way of a further force likewise in the closing direction 409 by way of the gas which flows in through the inflow channel 408. The second spring 304 exerts a second spring force on the closure element 305, which second spring force acts counter to the first spring force. The first spring force of the first spring 302 and the second spring force of the second spring 304 are dependent on the stroke in accordance with Hooke's Law. A force which is dependent on the difference of the first spring force and the second spring force acts on the closing element 301, said differential force being linear with respect to the deflection of the springs. In FIG. 1, the second spring 304 loads the closure element 305 with a force in the opening direction 410. The first spring 302 and the second spring 304 ensure a connection between the closing element 301 and the closure element 305, by pressing the closing element 301 and the closure element 305 against one another. It is therefore possible, for example, to manufacture the closing element 301 and the closure 305 separately and to dispense with a fixed connection between the closing element 301 and the closure element 305. In the case of a corresponding design of the spring forces and the valve dynamics, a separation of the components during operation of the proportional valve 100 can be avoided, which prevents wear problems. For example, the first spring force can be greater in terms of magnitude than the second spring force, with the result that the passage opening 102 is closed in a basic state of the proportional valve 100 and opens only in the case of energization of the magnet coil 201. As an alternative or in addition, the second spring force can be selected to be greater than the maximum occurring closing forces on the valve seat 103, which maximum occurring closing forces result from the supply pressure and the throughflow. The supply pressure corresponds to the pressure in the inflow space 401. This can ensure that the valve seat 103 opens reliably in every operating condition.

The metering of a gas by means of the proportional valve 100 takes place by way of energization of the magnet coil 201. In the basic state, that is to say a non-energized state of the magnet coil 201, the valve seat 103 is loaded by the second spring 304 with the second spring force in the opening direction 410, and is loaded via the closing element 301 with the first spring force in the closing direction 409. If the first spring force of the first spring 302 together with further pneumatic forces which act in the closing direction 409 is greater than the second spring force which acts in the opening direction 410, the valve seat 103 remains closed. In the case of energization of the magnet coil 201, the magnet armature 202 is moved in the opening direction 410 by way of the magnetic field of the magnet coil 201. The force on the magnet armature 202 and therefore on the closing element 301 acts in the opening direction 410 counter to the first spring force, with the result that the force in the opening direction 410 prevails on the closure element 305, and the passage opening 102 and the valve seat 103 are therefore released. The stroke movement of the magnet armature 202 can be controlled by means of setting of the electric current strength of the magnet coil 201. Here, in the case of a rising current strength, a rising opening stroke is achieved and more gas is conducted from the inflow space 401 through the passage opening 102 into the outflow space 402. In the case of a reduction of the electric current strength, the opening stroke is also reduced. When the energization is ended, the valve seat 103 closes on account of the first spring 302 and the supply pressure in the inflow space 401.

Figure 2:
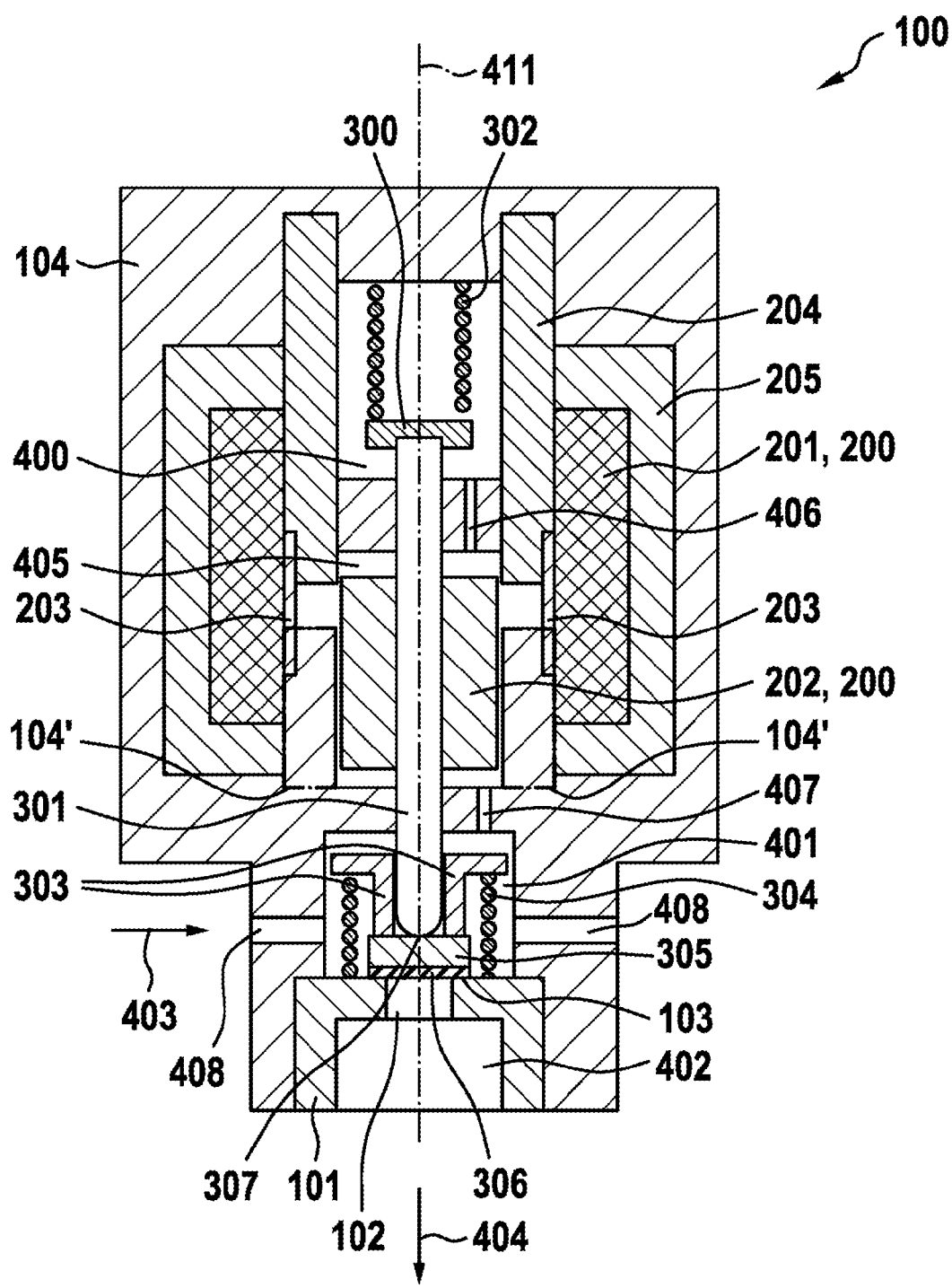
FIG. 2 shows a cross section of a proportional valve in accordance with a second exemplary embodiment with a contact point of crowned configuration between a closing element and a closure element.

FIG. 2 shows a cross section of a proportional valve 100 in accordance with a further exemplary embodiment. The difference from the proportional valve 100 in FIG. 1 is that the contact point 307 between the closing element 301 and the closure element 305 is of crowned configuration.

Figure 3:
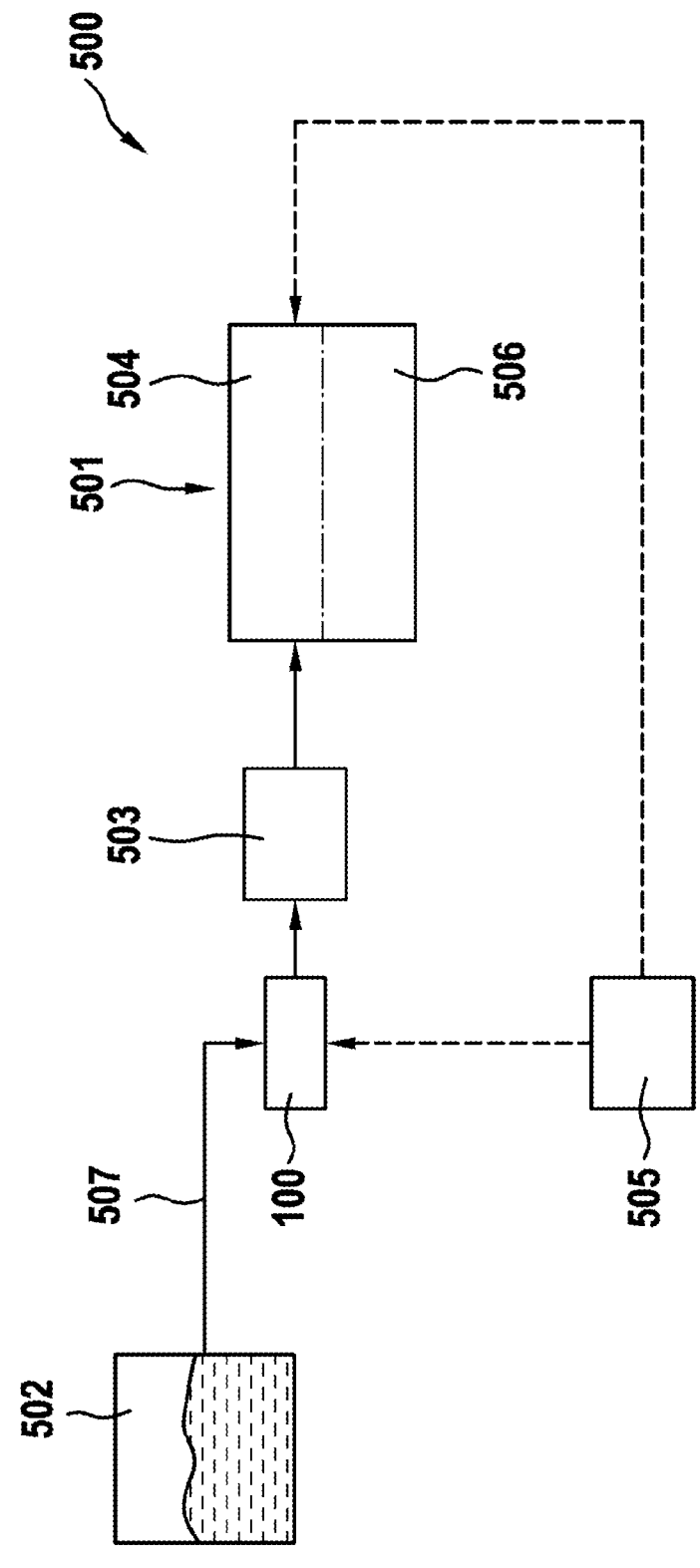
FIG. 3 shows a simplified construction of a fuel cell arrangement with a proportional valve.

FIG. 3 shows a simplified construction of a possible fuel cell arrangement 500 having the proportional valve 100 for controlling a hydrogen feed to a fuel cell 501. The fuel cell arrangement 500 comprises an anode region 504 and a cathode region 506. Furthermore, the fuel cell arrangement 500 comprises a tank 502, in which a gaseous medium (here, hydrogen) is stored. The gaseous medium is conducted via an inflow line 507 from the tank 502 through the inflow channel 408 which is realized as an opening in the valve housing 104 into the inflow space 401 of the proportional valve 100, as shown in FIGS. 1 and 2, for example. Via the passage opening 102, the gaseous medium can be conducted into the nozzle body 101 of an injection pump 503 and, from there, can be fed to an anode region 504 of the fuel cell 501.

By means of the proportional valve 100, a throughflow rate of the gaseous medium through the proportional valve 100 can be controlled by way of setting of the opening stroke. The setting of the opening stroke can be carried out by a control unit 505 by way of setting of the electric current strength on the magnet coil 201 of the proportional valve 100. The magnitude of the opening stroke is dependent on the electric current strength. As a result, a needs-oriented setting of the gas feed to the fuel cell 501 can be carried out.

Figure 5:
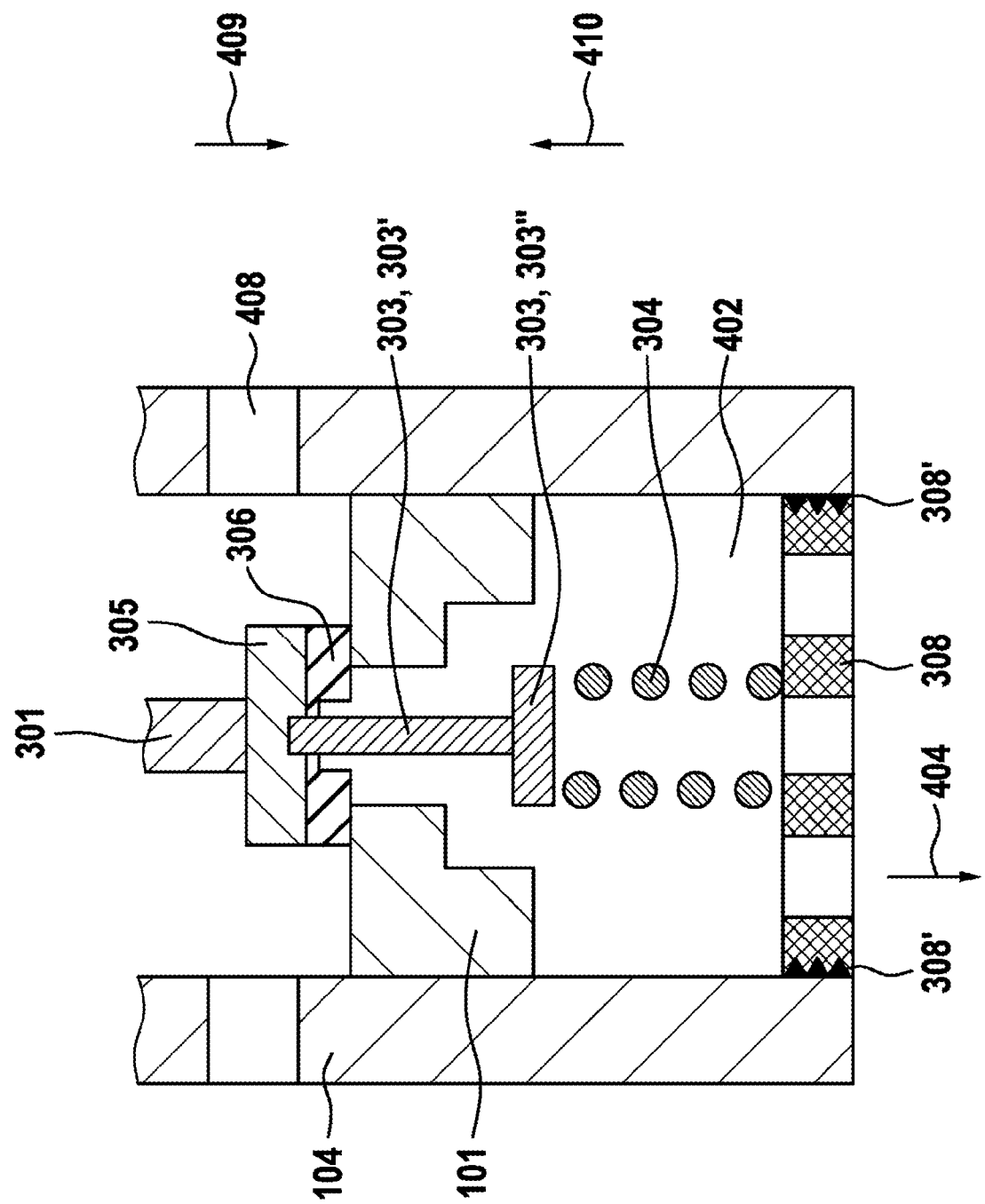
FIG. 5 shows a detail of a cross section of a proportional valve in accordance with a fourth exemplary embodiment.

FIG. 5 shows a detail of a cross section of a proportional valve 100 in accordance with a further exemplary embodiment. Said exemplary embodiment differs from the exemplary embodiment which is shown in FIG. 1 in terms of the arrangement of the second spring 304. In the exemplary embodiment which is shown in FIG. 5, the second spring 304 is arranged on the outflow side, that is to say in the outflow space 403. Here, the supporting structure 303 comprises a disk-shaped element 303" and a connecting pin 303'. The connecting pin 303' is set onto the closure element 305 at a first end, and is connected to the disk-shaped element 303" at a second end. The connecting pin 303' bears centrally against the closure element 405. The second spring force acts in the opening direction 410. The second spring 304 is supported on a spring washer 308 which is arranged on a side of the second spring 304, which side faces away from the supporting structure 303, said second spring 304 pressing on the disk-shaped element 303" and therefore on the connecting pin 303' which transmits the force in the opening direction 410 to the closure element 405. As a result, the spring force is introduced centrally into the closure element 305, with the result that a displacement or tilting of the closure element 305 can be avoided during opening. The spring washer 308 is arranged on a side of the nozzle body 101, which side faces away from the closure element 305. The spring washer 308 makes setting of the second spring force possible. For this purpose, the spring washer 308 can be provided with a thread 308', as shown in FIG. 5. As an alternative or in addition, the spring washer 308 can be pressed in to the required dimension. To this end, a central bore is arranged in the spring washer 308, in order for the supporting structure 303 to be reached by way of a caliper. As a result of the satisfactory accessibility of the second spring 304, a setting of said second spring 304 can be realized in a simple way, for example via the thread 308' or a pressing operation to the required dimension. Component tolerances can be reduced as a result. Furthermore, overall designs can therefore be realized, in the case of which the first spring 302, that is to say the closing spring, is not adjustable. Since at least one of the springs should be adjustable for the compensation of tolerances, this can take place via the adjustment of the second spring 304.

The invention claimed is:

1. A proportional valve (100) for controlling a gaseous medium, the proportional valve comprising
a valve housing (104) at least partially defining an inflow space (401),
a movable closing element (301) and a first spring (302) which is arranged on the closing element (301), the first spring (302) being configured to exert a first spring force on the closing element (301) in a closing direction, and
an actuator (200), the actuator (200) being configured to provide an adjustable force on the closing element (301), which adjustable force is directed counter to the first spring force,
wherein the closing element (301) moves towards a valve seat (103) in the closing direction and is configured to close and to open a passage opening (102) by way of movement of the closing element (301),
characterized in that the proportional valve (100) also comprises
a closure element (305) which is arranged at one end of the closing element (301) in the inflow space (401) and which is configured to move on and off of the valve seat (103), and
a second spring (304) being arranged on the closure element (305), and the second spring (304) being configured to exert a second spring force on the closure element (305), the second spring force acting counter to the first spring force,
wherein the passage opening (102) communicates with the inflow space (401) when the passage opening (102) is opened by movement of the closure element (305) off the valve seat (103),
wherein supply pressure is a pressure in the inflow space (401) and exerts on the closure element (305) a nonzero closing force in the closing direction,
wherein throughflow of the gaseous medium through the proportional valve (100) exerts on the closure element (305) a nonzero closing force in the closing direction, and
wherein the second spring force is greater than a sum of the nonzero closing forces exerted on the closure element (305) by the supply pressure and by the throughflow.

2. The proportional valve (100) as claimed in claim 1, characterized in that the closing element (301) and the closure element (305) are arranged on one another by way of the first spring force and the second spring force.

3. The proportional valve (100) as claimed in claim 1, characterized in that the first spring force is greater than the second spring force.

4. The proportional valve (100) as claimed in claim 1, characterized in that the closure element (305) comprises a supporting structure (303), the second spring (304) being operatively connected to the closure element (305) via the supporting structure (303).

5. The proportional valve (100) as claimed in claim 1, characterized in that the closure element (305) is of pot-shaped configuration.

6. The proportional valve (100) as claimed in claim 1, characterized in that an elastic element (306) is arranged on a face of the closure element (305) facing the passage opening (102).

7. The proportional valve (100) as claimed in claim 1, characterized in that the inflow space (401) and the closing element (301) are arranged on a first side of the passage opening (102), and an outflow space (402) is configured on a second side of the passage opening (102), wherein the second side faces away from the first side, such that the inflow space (401) and the outflow space (402) are configured to be connected to one another via the passage opening (102).

8. The proportional valve (100) as claimed in claim 1, characterized in that a contact point (307) of the closing element (301) with the closure element (305) is of crowned configuration.

9. The proportional valve (100) as claimed in claim 1, characterized in that the actuator (200) comprises a magnet coil (201) and a magnet armature (202), the magnet armature (202) being connected fixedly to the closing element (301), such that the magnet armature (202) is configured to be moved in a reciprocating movement by way of the magnet coil (201).

10. A fuel cell arrangement having a proportional valve (100) as claimed in claim 1.

* * * * *